United States Patent [19]

Maeda et al.

[11] Patent Number: 5,073,880
[45] Date of Patent: Dec. 17, 1991

[54] INFORMATION RECORDING/REPRODUCING METHOD AND APPARATUS

[75] Inventors: Takeshi Maeda, Kokubunji; Yoshito Tsunoda, Tokyo, both of Japan

[73] Assignee: Hitachi, Ltd., Tokyo, Japan

[21] Appl. No.: 285,584

[22] Filed: Dec. 16, 1988

[30] Foreign Application Priority Data

Dec. 18, 1987 [JP] Japan ............................. 62-318820
Mar. 10, 1988 [JP] Japan ............................. 63-54851

[51] Int. Cl.$^5$ ............................................. G11B 7/00
[52] U.S. Cl. .................................. 369/32; 369/44.13; 369/44.26; 369/44.34
[58] Field of Search ............... 369/44.13, 44.26, 44.34, 369/44.36, 44.38, 44.39, 32, 111

[56] References Cited

U.S. PATENT DOCUMENTS

| 4,535,431 | 8/1985 | Bricot et al. | 369/44.34 |
|---|---|---|---|
| 4,710,909 | 12/1987 | Tsuyoshi et al. | 369/44.26 |
| 4,748,609 | 5/1988 | Yonezawa et al. | 369/44.26 |
| 4,807,210 | 2/1989 | Kaku et al. | 369/44.26 |
| 4,879,708 | 11/1989 | Getreuer et al. | 369/44.26 |
| 4,933,922 | 6/1990 | Yokogawa | 369/44.34 |
| 5,012,460 | 4/1991 | Popovich et al. | 369/44.26 |

FOREIGN PATENT DOCUMENTS 2110843  6/1983  United Kingdom .

Primary Examiner—Donald McElheny, Jr.
Attorney, Agent, or Firm—Antonelli, Terry, Stout & Kraus

[57] ABSTRACT

Data recording and/or reproduction on or from a recording medium on which tracking signal detection marks are intermittently provided along each track in a pattern wobbling alternately across the track center line with a very small lateral displacement therefrom, wherein data recording area is defined between the tracking signal detection mark. A servo control system for controlling a write/read light spot so as to follow the track with the aid of a tracking signal obtained by detecting the tracking signal detection marks is provided with a low-pass filter circuit having a cut-off frequency lower than the frequency at which the tracking signal detection marks are detected. A data is recorded or reproduced on or from the recording areas of the recording medium while following the track under the control of the servo system. A blank area where data recording is inhibited is provided between the data recording area and the tracking signal detecting mark (prepit) to suppress interference to the data. A particular access prepit pattern which allows track addresses to be at least approximately detected upon passing of the light spot over the track of the recording medium is previously provided together with synchronizing marks in a synchronizing area.

15 Claims, 10 Drawing Sheets

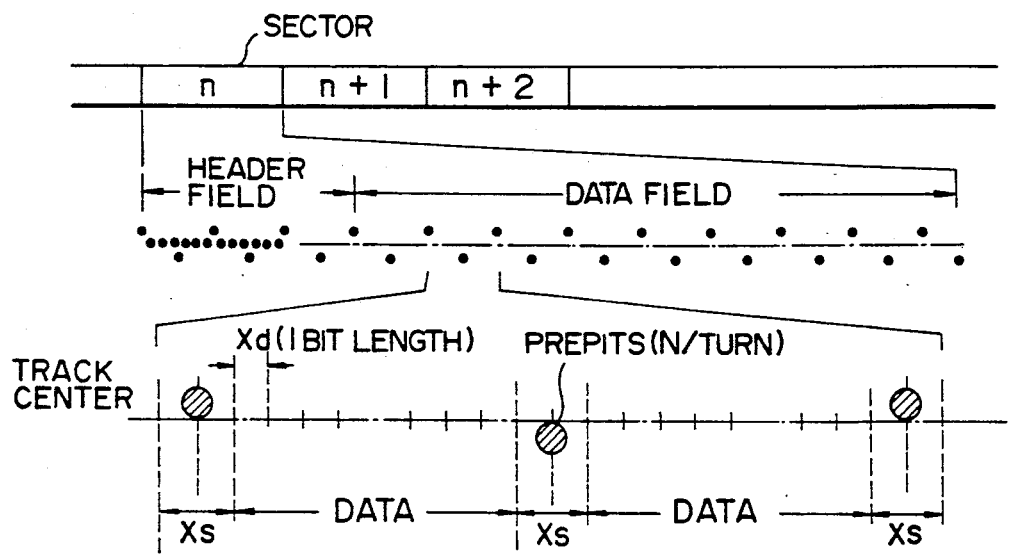

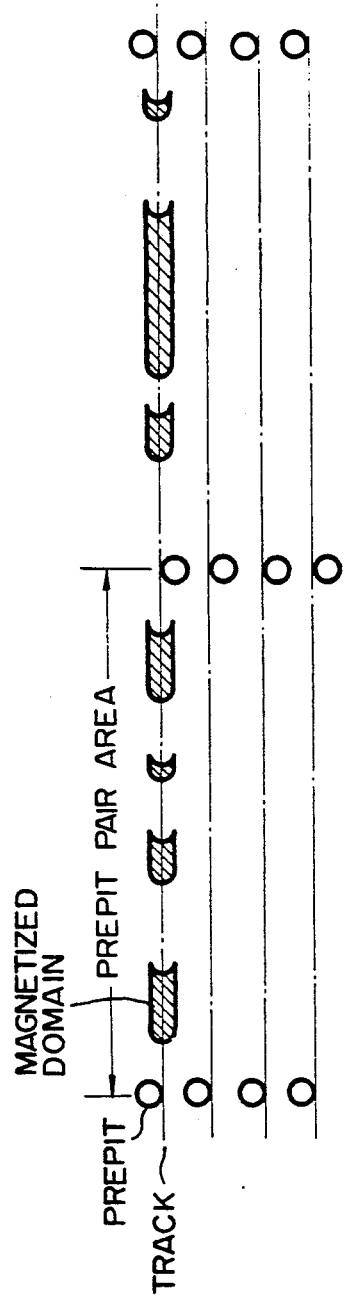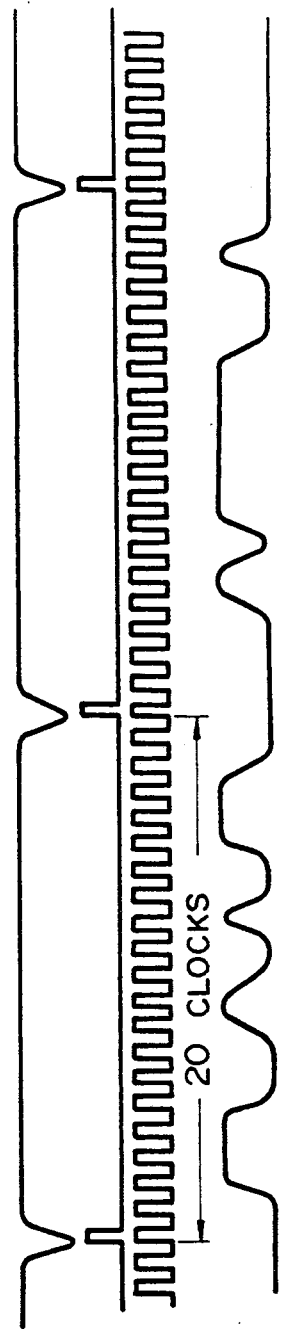
FIG. 5(A)
FIG. 5(B) PREPIT SIGNAL
FIG. 5(C) PIT PULSE
FIG. 5(D) CLOCK SIGNAL
FIG. 5(E) DATA SIGNAL

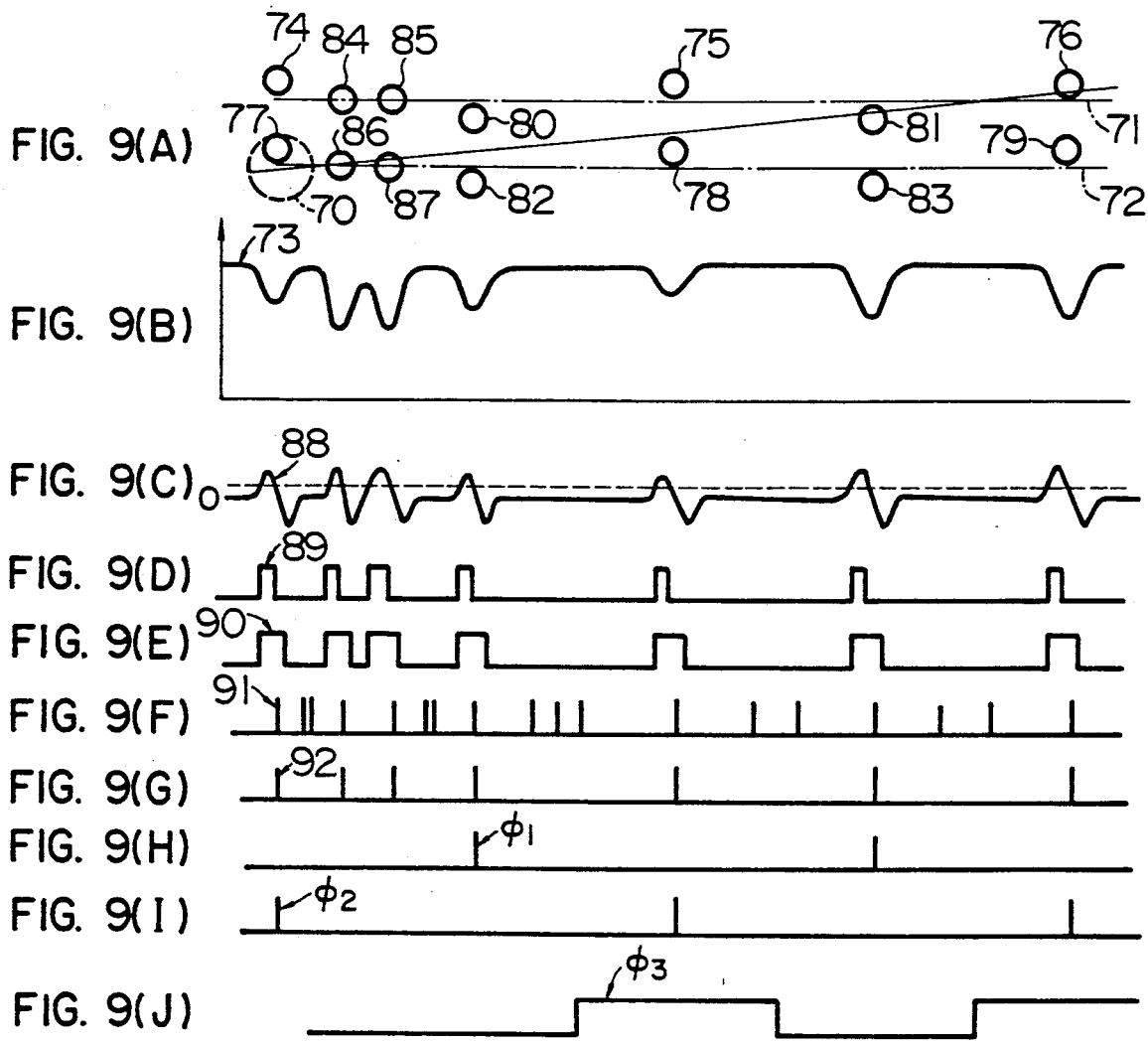
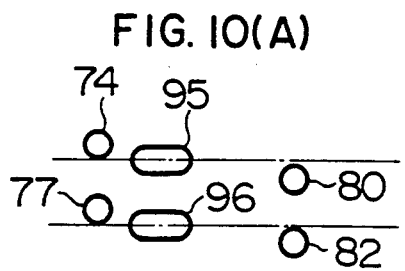 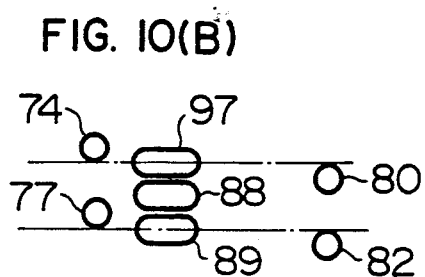

INFORMATION RECORDING/REPRODUCING METHOD AND APPARATUS

BACKGROUND OF THE INVENTION

The present invention relates to a method and an apparatus for recording and/or reproducing information on or from an information recording medium such as an optical disk, a magnetic disk, a magnetooptical disk and others. More particularly, the present invention is concerned with the information recording/reproducing method and apparatus capable of recording and/or reproducing information on or from the recording medium along record tracks with an enhanced accuracy by using a sampling servo type tracking system and which are profitably suited for the information recording and/or reproduction on or from an erasable recording medium susceptible to overwriting of information such as typified by a magnetooptical disk or the like media.

As a means for tracking the information recording tracks in the prior art information recording/reproducing systems such as optical disk apparatuses, magnetic disk apparatuses and others, there is known a sampling servo type tracking system in which marks for detecting a tracking signal are previously formed on the recording medium intermittently along the track in the form of so-called prepits, wherein data are recorded in the recording areas defined between the prepits. For further particulars, reference may be made, for example, to U.S. Pat. No. 4,364,118.

In recent years, reversible recording media have been developed for use in the optical disk apparatus. Among them, an overwritable (erasable) recording medium attracts attention. In particular, promising is the magnetooptical recording medium which permits the overwrite operation under application of the magnetic field modulated with the data signal to be recorded. A typical one of the overwritable disk systems operative through application of the modulated magnetic field is proposed, for example, in Japanese Patent Publication JP-B-60-48806.

When an optical disk apparatus is to be implemented by adopting both the sampling servo type tracking system and the magnetic field modulation overwrite system, it is necessary to modify or rearrange the tracking system as well as the track access system and the data recording/reproducing system so that the optical disk apparatus can carry out these various operations in an integrated manner. Heretofore, however, no proposal has been made in connection with the optical disk apparatus of such integrated structure because of problems remaining to be solved, such as mentioned below.

(1) In the sampling servo type tracking system, any possible defect of the tracking signal detection marks (prepits) will involve remarkable disturbance in the tracking servo signal, exerting very adverse influence to the tracking performance.

(2) Since the overwritable magnetooptical recording medium is employed, wherein the recording on the medium can only be carried out by resorting to the use of thermal energy of a light spot and at the same time a modulated magnetic field pulse signal, the magnetized domains (or data domains) as formed on the disk by the magnetooptical recording tend to deviate temporally from the recording (magnetic field) pulses.

(3) Because the amount of prepit signals such as the tracking signal detection mark signal, header information signal and others is great when compared with that of the magnetooptical signal representative of the record information (i.e. information to be recorded or reproduced), the prepit signal may leak into the information or data signal to thereby interfere with the latter.

(4) Means is required for detecting the wobbling phase of the meandering row of the tracking signal detection marks or prepits with high reliability.

(5) For realizing the track access operation, there is required a means for detecting the positional information of the information recording/reproducing means such as a light spot focussing system relative to the recording medium.

SUMMARY OF THE INVENTION

It is therefore an object of he present invention to provide an information recording/reproducing method and an apparatus for carrying out the same which are capable of deriving a tracking servo signal stably even when the tracking signal detecting marks or prepits should suffer from some defects and which thus can record and/or reproduce data on or from the recording medium between the tracking signal detecting marks (prepits) along the track with high accuracy.

Another object of the present invention is to provide information recording/reproducing method and apparatus which can detect the tracking signal as well as the clock signal from the prepits serving as the tracking signal detection marks with high reliability without being attendant with unwanted leakage of the prepit information into the record or data information.

A further object of the present invention is to provide overwritable information recording/reproducing method and apparatus in which track deviation (or tracking error) due to the movement of a light spot and/or the tilting of a recording medium can be prevented more positively while influence of the temporal shift of thermally recorded data can be reduced to a possible minimum.

A still further object of the present invention is to provide information recording/reproducing method and apparatus in which a sampling servo type tracking system is adopted and in which the positional information for the access operation can be detected from the recording disk.

According to the teachings of the present invention, the problems mentioned hereinbefore can be coped with or solved successfully in the manners described below.

(i) In connection with the problem (1), it is proposed according to an aspect of the invention that a servo circuit is provided with a low-pass filter circuit which is so configured as to have a cut-off frequency lower than the frequency at which the tracking signal detection marks (prepits) previously formed intermittently on a recording medium make appearance in the course of detection thereof, to thereby suppress the influence of defects of the marks.

(ii) Concerning the problem (2), a self-clocking system is adopted for generating a clock signal utilized in data processing. In this connection, it is noted that the temporal deviation between the data recording pulse and the magnetized domain formed by this recording pulse is constant within one and the same sector. By making use of this fact, the deviation is cancelled out by adopting the self-clocking system.

(iii) The problem (3) is solved by providing a blank area (recording inhibited area where no data is recorded) between the data recording area and the prepit serving as the tracking signal detection mark. By virtue of this feature, interference of the prepit signal to the recorded data or information can be reduced.

(iv) The problem (4) can be satisfactorily solved by providing previously in combination with the tracking signal detection marks a synchronizing mark in such a pattern which differs from both the prepit pattern and the data pattern. By detecting the synchronizing mark upon reproduction, the synchronizing signal can be generated with high reliability, which in turn allows the prepits serving as the tracking signal detection marks and other functions to be detected with high accuracy.

(v) To solve the problem (5), it is taught according to still another aspect of the invention that a specific pattern for the access operation is provided which allows the track addresses to be detected at least approximately upon simple passing of the optical spot over the tracks. This access pattern is previously formed in a synchronizing area together with the synchronizing mark. Additionally, at least a part of the address information and preferably the more significant bits of the address may be provided between the tracks with a view of making it possible to detect the positional information even in the course of high-speed movement of the light spot. Further, in order to detect accurately or definitely the track address information, the position of the tracking signal detection marks or prepits provided in the wobbling or meandering row pattern or the position of the specific prepit mentioned above may be slightly displaced so that the prepit can also be used as the mark for detecting the address information. By virtue of this arrangement, the positional information of the light spot can be detected straightforwardly from the disk surface to allow a speedy access to a desired track by controlling an associated actuator (light spot position control means) in accordance with the detected positional information.

According to the teachings of the present invention, the tracking signal as well as the clock information can be detected with improved reliability from the wobbled row or pattern of the prepits serving as the tracking signal detection marks even in the case of an overwritable recording medium, while avoiding leakage or interference of the prepit signal to the record data. Besides, the address information for making access to the track can also be detected. Furthermore, according to the invention, compatibility with the write-once type or other type of recording media as well as the other types of information recording/reproducing apparatuses can be assured.

BRIEF DESCRIPTION OF THE DRAWINGS

FIG. 3 is a diagram for illustrating an example of the track format (concerning only the prepit pattern) which can be employed in carrying out the present invention;

FIG. 4 is a chart for illustrating two different prepit patterns for the detection of the tracking signal together with the detected signals;

FIGS. 5(A) to 5(E) are diagrams for illustrating a track format (concerning the prepits and the record data) which can be employed in carrying out the invention together with waveforms of signals as reproduced;

FIGS. 9(A) to 9(J) are diagrams for illustrating, respectively, prepit pattern and various signals generated in the system shown in FIG. 8 in the track deviation (tracking error) detecting operation mode;

FIGS. 10(A) and 10(B) are schematic diagrams for illustrating examples of a synchronizing mark or prepit pattern;

DESCRIPTION OF THE PREFERRED EMBODIMENTS

Figure 1:
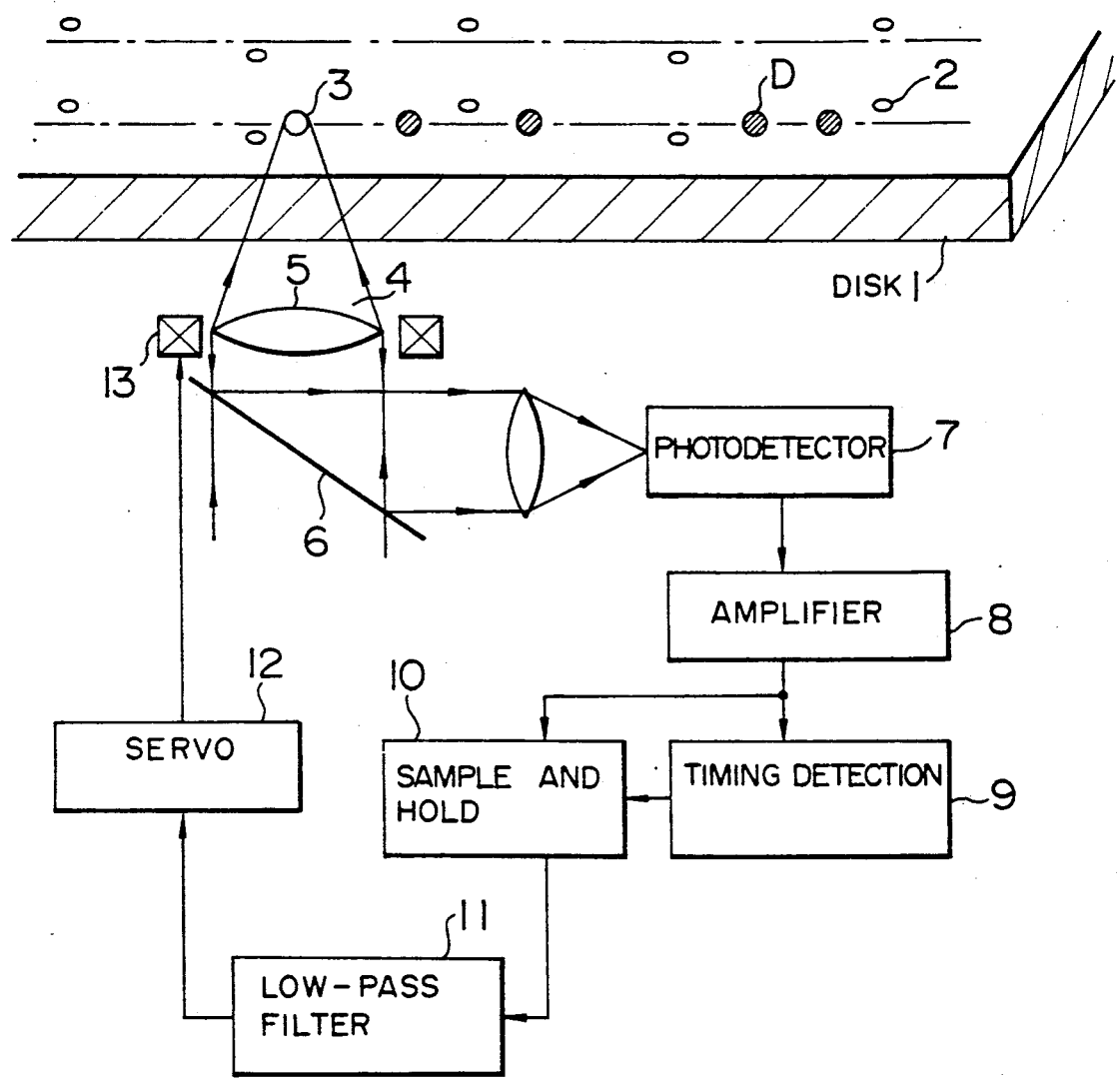
FIG. 1 is a schematic diagram for illustrating the general concept underlying the optical disk information recording/reproducing apparatus according to an exemplary embodiment of the present invention.

FIG. 1 shows schematically a general arrangement of an optical disk information recording/reproducing apparatus according to an exemplary embodiment of the present invention. Referring to the Figure, an optical disk 1 is previously provided with a multiplicity of tracking signal detecting marks 2 in an intermittent pattern. More specifically, the tracking signal detecting marks 2 are formed, being periodically wobbled relative to the center line of the track with a very small distance or displacement therefrom, as will be seen in FIG. 1. Each mark 2 is in the form of a so-called prepit (or phase pit of concave or convex shape). The marks 2 are originally formed in a disk prototype upon fabrication thereof by means of a laser cutting tool. The marks or prepits 2 on the optical disk 1 are formed upon replication thereof from the prototype. Formed over the disk 1 is a recording film (not shown) on which data D are recorded along the track center line in the areas located between the tracking signal detecting marks or prepits 2 by illuminating the recording film with a light spot. To this end, a laser light beam 4 emitted from a laser light source (not shown) is focussed on the recording film of the disk 1 by a lens 5 to thereby form the light spot 3 on the recording film of the disk 1. The reflected light beam from the disk 1 is introduced to a photodetector 7 through a beam splitter 6.

The signal originating in the tracking signal detecting marks or prepits 2 is first amplified by an amplifier 8 to be subsequently inputted to a timing detection circuit 9 for detecting the timing at which the tracking signal detecting marks or prepits 2 makes appearance, wherein the mark or prepit signal is separated from other data signals. The timing detection circuit 9 may be composed of a differentiator circuit and a zero-cross comparator. Alternatively, the differentiator circuit may be spared by disposing a pair of photodetectors 7 in the direction in which the light spot is caused to move, wherein difference between the outputs of the paired photodetectors 7 may be utilized for detecting the timing of concern. With the aid of the output signal from the timing detection circuit 9, a sample and hold circuit 10 having the input supplied with the signal output from the amplifier 8 holds the signal originating in the mark or prepit 2. Since the tracking signal detecting prepit 2 is meanderingly wobbled on a pair basis relative to the track center line with a very small distance therefrom, the difference between the values of the signal representing the paired marks 2 as held by the sample and hold circuit 10 is derived in a manner described hereinafter in more detail. In this way, one sample value of the tracking signal is derived from one pair of the marks 2. The sampled tracking signal thus detected is caused to pass through a low-pass filter circuit 11 to be subsequently processed by a servo circuit 12, the output signal of which is supplied to a tracking actuator 13 to be utilized for the tracking control performed by the actuator. In this case, the frequency at which the tracking signal detection marks (prepits) 2 make appearance in the detection signal is given by n.r, where n represents the number of times the tracking signal is sampled along one turn of the track on the disk and r represents the rotation number of the disk per second. More specifically, when the cut-off frequency of the low-pass filter 11 is represented by $f_c$, the frequency n.r of the tracking signal detection mark signal and the cut-off frequency of the low-pass filter circuit 11 are so selected that $n.r > f_c$. In this conjunction, it is noted that the cut-off frequency $f_c$ has to be selected greater than the frequency band $f_s$ required for the servo circuit 12.

As a numerical example, it is assumed that the disk 1 having a diameter of 5 inches is rotated at 30 Hz and that the number of the tracking signal detection marks (prepits) is 12,000 and hence the number of samples is 6,000, then the cut-off frequency $f_c$ of the low-pass filter circuit 11 may be selected on the order of 30 KHz. In view of the fact that defect reflecting components having a duration shorter than 30 μS tends to be dominant in the present state of the art, it is preferred to select the cut-off frequency $f_c$ of the low-pass filter circuit 11 on the order of 30 KHz, as mentioned above, with a view to eliminating any material influence of the defect components.

With the arrangement described above, even when the tracking signal detection marks suffer from some sort of defect, the influence of such defect can be suppressed substantially completely by the low-pass filter circuit 11. Additionally, because the cut-off frequency $f_c$ of the low-pass filter circuit 11 is selected higher than the frequency band $f_s$ of the servo circuit 12, the tracking servo operation itself can be protected against the influence of the defect.

Figure 2:
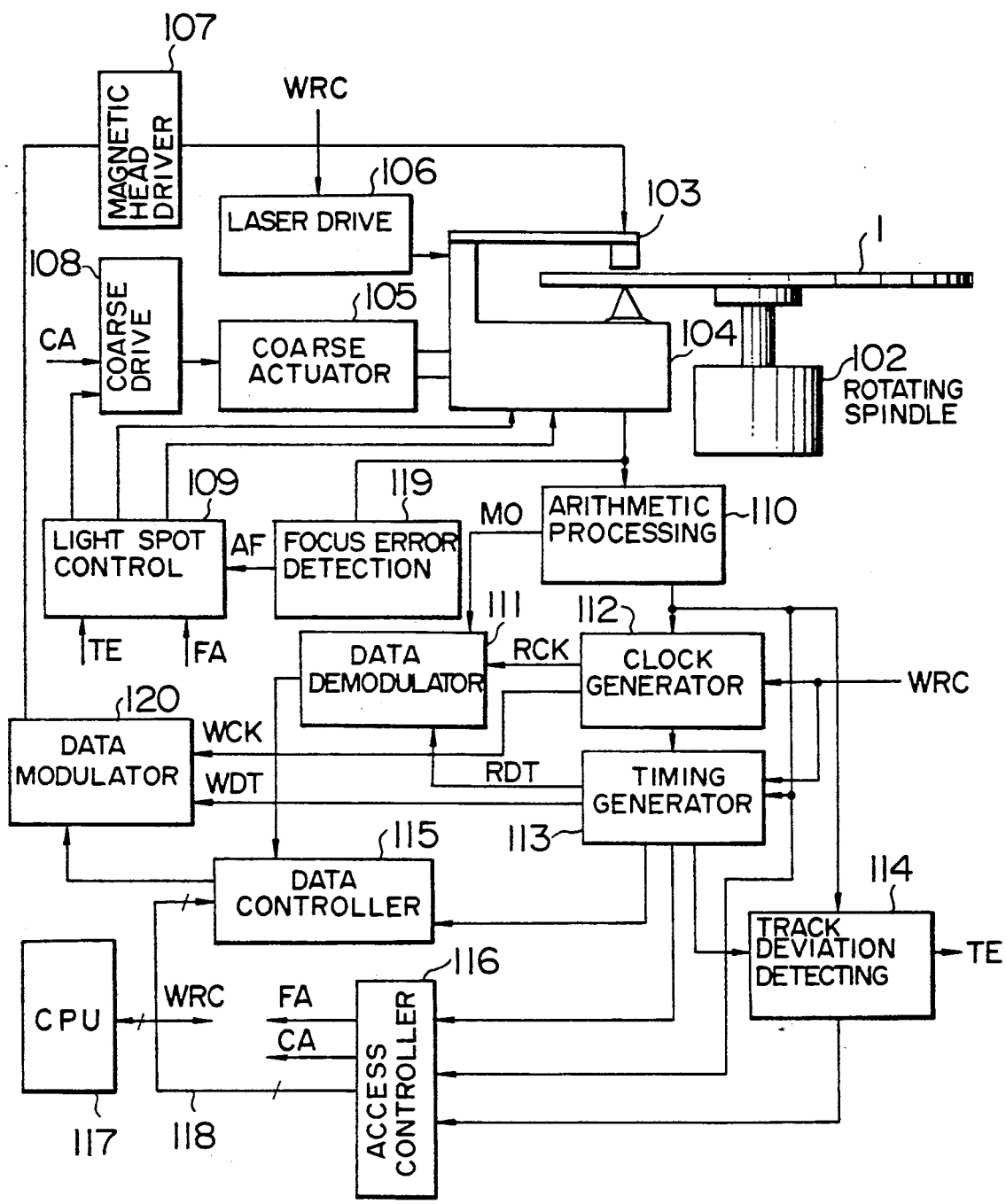
FIG. 2 is a block diagram showing a system structure of the optical disk information recording/reproducing apparatus according to an embodiment of the present invention.

Next, a general arrangement of the optical disk apparatus according to an embodiment of the invention will be described in more detail by reference to FIG. 2 on the assumption that the invention is applied to a magnetooptical disk apparatus. Referring to FIG. 2, a magnetooptical disk 1 is driven by a rotating spindle 102. A floating magnetic head 103 is disposed in the floating state above the disk surface with a gap of several microns therefrom. Disposed in opposition to the magnetic head 103 is an optical head 104 which is so positioned that the light spot produced by the optical head 104 impinges on the disk surface within a region to which the magnetic field generated by the magnetic head 103 is applied. At this juncture, it is to be mentioned that the technique concerning the magnetic field modulation type overwritable disk system using the floating magnetic head is disclosed in detail in U.S. patent application Ser. No. 153,094, the contents of which are herein incorporated for reference with further description of this technique being omitted. Detection signal produced by the optical head 104 is supplied to an arithmetic processing circuit 110 to be separated into a magnetooptical signal representative of record data recorded in the form of magnetized domains, a signal originating in the tracking signal detection marks provided in the form of the prepits (this signal will be also referred to as the prepit signal hereinafter), a header signal and others. The magnetooptical signal (i.e. data signal) is applied to a data demodulation circuit 111 to be demodulated with the aid of a reproducing clock signal RCK and a data location indicating gate signal RDT, wherein the demodulated data signal outputted from the data demodulation circuit 111 is transmitted to a data controller 115.

The prepit signal outputted from the arithmetic processing circuit 110 is supplied to a clock generating circuit 112 for generating the clock signals RCK and WCK which are required for the data reproduction and recording, respectively and for generating a clock signal for the tracking operation. Additionally, the prepit signal is supplied to a track deviation detecting circuit 114 for generating a track deviation (tracking error) signal TE by utilizing a control signal produced from a timing generation circuit 113. Further, the prepit signal is supplied to the timing generation circuit 113 for producing the control signal for detecting the track deviation (tracking error), a control signal for detecting a position signal for the track access, a control signal for controlling a data to be recorded or reproduced and other signals by utilizing the clock signal produced by the clock generation circuit 112, wherein the track deviation detecting control signal is supplied to the track deviation detecting circuit 114, the positional information detecting control signal is supplied to an access controller 116 and the data control signal is supplied to the data controller 115.

The access controller 116 is supplied with the prepit signal from the arithmetic processing circuit 110 for detecting the information indicative of the position of the light spot with the aid of the control signal produced by the timing generation circuit 113. The access controller 116 is further supplied with the track deviation detecting signal from the track deviation detecting circuit 114 for deriving fine track position information. On the basis of these input signals and a desired track identification signal designated by a high-rank CPU (inputted through a bus 118), the access controller 116 issues commands FA and CA for controlling two actuators, respectively.

The reproduced data resulting from the processing by the data controller 115 is transmitted to the CPU 117 by way of the bus 118. On the other hand, a data to be recorded is supplied to the data controller 115 from the CPU 117 through the bus 118 to be added with control data such as ECC (error correction/concealment code) and others and undergo interleave and other processing, the resulting data being then supplied to a data modulation circuit 120. In this data modulation circuit 120, a data pulse signal to be actually recorded on the disk surface is generated by utilizing the clock signals WCK and WDT supplied from the clock generation circuit 112 and the timing generation circuit 113, respectively. In accordance with the data pulse signal, a magnetic head diver circuit 107 is energized for thereby modulating correspondingly the magnetic field applied by the magnetic head 103. At that time, the power of the light spot on the disk surface is controlled by a laser drive circuit 106 at the timing synchronized with a signal WRC issued by the CPU 117 and representing the mode of recording or reproduction.

A part of the detection signal from the optical disk 1 is inputted to a focus error detection circuit 119 for generating a control signal AF for an automatic focussing servo system. The control signal AF is then applied to a light spot control circuit 109 to undergo phase compensation and other processing. The output signal of the light spot control circuit 109 is utilized for driving an objective lens (not shown in FIG. 2 but can be exemplified by the lens 5 shown in FIG. 1) incorporated in the optical head 104 for thereby effectuating the focussing control. In this conjunction, it should be mentioned that an example of the focussing control technique which can be adopted in carrying out the invention is disclosed in U.S. Pat. No. 4,742,218. Further, the light spot control circuit 109 is supplied with the track deviation (tracking error) signal TE which undergoes phase compensation and other processing to generate control signals for controlling a fine actuator and a coarse actuator, respectively. The coarse actuator control signal serves to drive a coarse actuator 105 through a coarse drive circuit 108 for moving the head assembly (103, 104) as a whole in the direction radially of the disk.

The dignal FA outputted from the access controller 116 is inputted to the light spot control circuit 109 for controlling a fine actuator (not shown in FIG. 2) incorporated in the optical head 104 for making it possible to perform a fine control of the light spot at a high speed, as required in the access operation. Further, the signal CA outputted from the access controller 116 is supplied to the coarse drive circuit 108 for the purpose of controlling the macroscopical or coarse movement of the optical head as a whole as required in the access operation. Parenthetically, such two-stage tracking servo system in which two actuators, i.e. a coarse actuator and a fine actuator are used, as described above, is disclosed in U.S. Pat. No. 4,607,358.

A recording/reproduction indicating signal WRC is inputted to the clock generation circuit 112 and the timing generation circuit 113 for controlling the output signals of these circuits 112 and 113, respectively, in accordance with the recording mode or reproduction mode.

Now, the general arrangement of the optical disk apparatus according to an embodiment of the invention have been described in the foregoing. It will be noted that the timing detection circuit 9 shown in FIG. 1 is included in the timing generation circuit 113 shown in FIG. 2. The sample and hold circuit 10 and the low-pass filter circuit 11 shown in FIG. 1 are incorporated in the track deviation detecting circuit 114 shown in FIG. 2. Finally, the servo circuit 12 shown in FIG. 1 is included in the control circuit 109 shown in FIG. 2.

Next, referring to FIG. 3, description will be made of a prepit pattern of the marks for detecting the header information and the tracking signal. Each track on the disk surface is provided with prepit patterns repeated for every data delimiter or sector. More specifically, each sector includes a header field at the start thereof, which header field carries address information and other control information recorded in the form of prepits on and along the track center line. Further, in succession to the header field, a data field is provided in which data are recorded. Throughout the header field and the data field, the tracking signal detect marks are provided in the form of prepits formed intermittently, being meanderingly wobbled to the left and the right relative to the track center line by a very small distance or displacement. The data is recorded on and along the track center line between the tracking signal detecting marks (prepits). Starting from these prepits, pit pulses indicating the prepit positions are generated, wherein the clock signal utilized for the data recording/reproduction and the track deviation (tracking error signal are detected from the pit pulses. Typical waveforms of the track deviation signal are illustrated in FIG. 4. The meandering or wobbling prepit pattern may be realized in either one of two patterns, i.e. a phase-inverted prepit pattern and an in-phase prepit pattern. Accordingly, the track deviation signal waveforms for the phase-inverted pit pattern and the in-phase pit pattern are illustrated in the state where the servo operation is off and in the state where the track-following servo operation is being activated (on).

Figure 6:
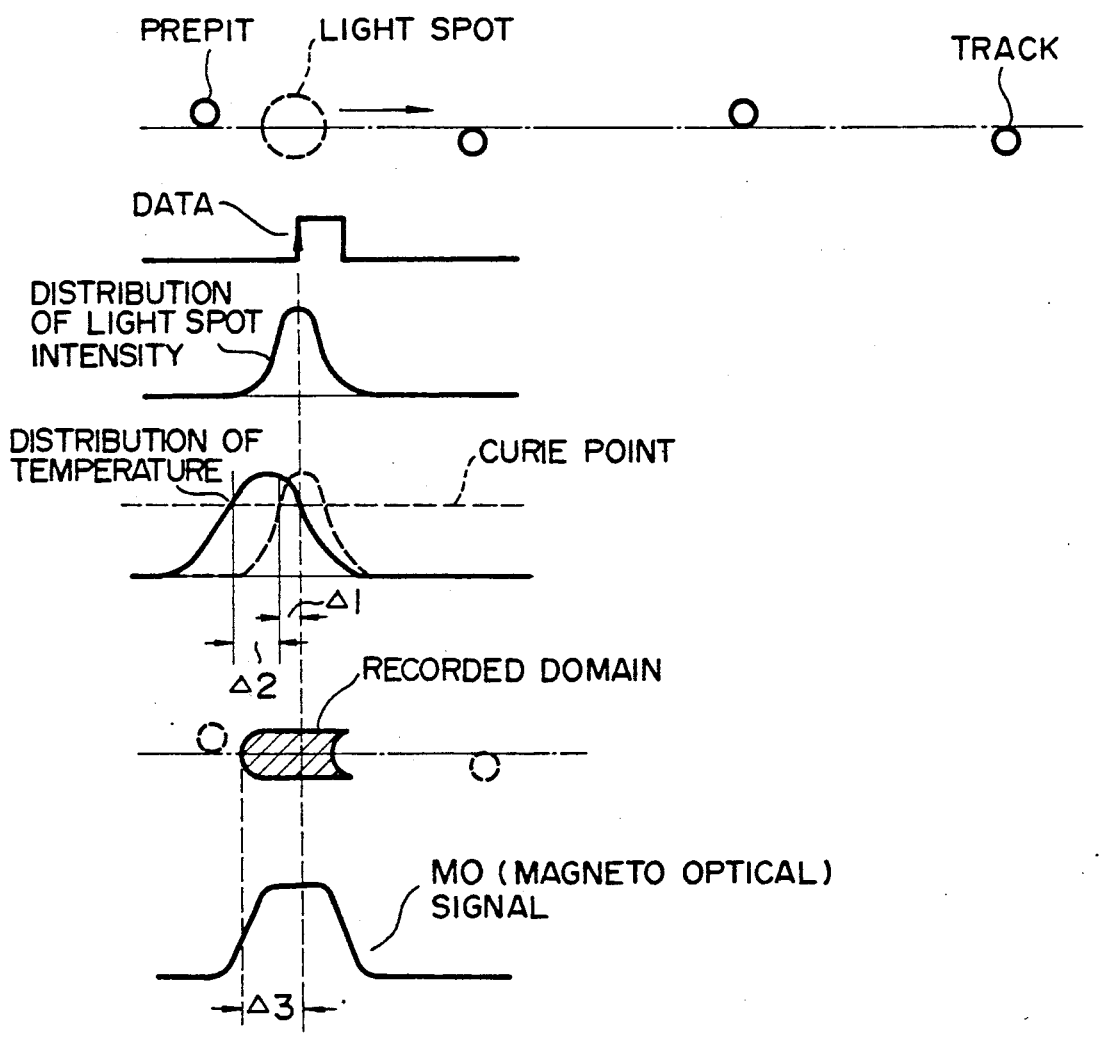
FIG. 6 is a schematic diagram for illustrating temporal deviation taking place in the magnetooptical data recording.

The data recording in the data area located between the prepits is accomplished by deriving a clock signal (shown in FIG. 5(D)) from the prepit pulse signal shown in FIG. 5(C) in synchronism with the latter and modulating the data to be recorded with the clock signal. In the case of the magnetic field modulation overwritable disk system, each of the magnetized domains thus formed is generally of an elongated crescent-like shape, as will be seen in FIG. 5(A). In connection with reading or reproducing the data recorded in the form of the magnetized domains, the use of the clock signal derived from the prepit array is attended with problems mentioned below. More specifically, referring to FIG. 6, since a data pulse is recorded through illumination by the light spot and the magnetic field, the corresponding temperature distribution on the disk surface is such that a trail portion $\Delta 1$ follows the light spot under the influence of the light intensity distribution thereof. According to the principle underlying the magnetic field modulation overwriting system, the temperature distribution on the disk surface where the temperature becomes lower than the Curie point is recorded as the data domain magnetized in compliance with the direction of externally applied magnetic field. Accordingly, when the location of the disk surface distanced by $\Delta 2$ from the center of the temperature distribution becomes lower than the Curie temperature, there arises a deviation $\Delta 3$ corresponding to a sum of $\Delta 1$ and $\Delta 2$ between the trail edge of the data pulse for modulating the magnetic field and that of the magnetized domain (i.e. the record domain) actually formed on the disk.

As will be seen from the above elucidation, in the case of the magnetic field modulation overwriting system, there takes place in principle a deviation between the recording pulse (data pulse) and the domain recorded thereby. Although magnitude of this deviation may vary in dependence on the power level of the illumination by the light spot, linear velocity of the light spot, sensitivity of the optical disk and other factors, it may be reasonably regarded that the deviation remains substantially constant within one and the same sector and undergoes no change at each of the individual domains. Under the circumstances, a self-clocking system designed for generating the clock signal from the data is adopted as the reproducing clock generating means in the case of the illustrated embodiment of the present invention.

At this juncture, another problem has to be mentioned. When the magnetooptical (MO) signal originating in the magnetized domain and the prepit signal originating in the prepits are to be detected in terms of a difference and a sum between two polarized light components, as will hereinafter be described in detail, the prepit signal leaks into the microoptical signal because of an intensity ratio on the order of 1:50 to 100 between these two signals. By way of example, assuming that the light spot is 1.5 μm in diameter and that the prepit has a diameter of 0.6 μm, the intensity of the prepit signal becomes equal to that of the magnetooptical signal when they are spaced about 1.3 μm from each other. Accordingly, when taking into consideration of a margin for the signal detection, the recording area for the data to be recorded (i.e. magnetized domain) has to be distanced from the center of the prepit about 2 to 2.5 μm. To this end, a blank area (recording area where data is inhibited from being recorded) $X_s$ of about 4 to 5 μm is provided around each prepit inclusive thereof, as is illustrated in FIG. 3.

Further, when the prepit signal is differentiated for the purpose of detecting the center position of prepit, erroneous signals may be produced due to noise, defect on the optical disk and other factors, resulting in that the signal incapable or representing correctly the prepit position is generated, whereby the track deviation (tracking error) signal is falsified because of incapability of detecting the correct timing signal. Besides, in order to detect the track deviation signal, it is necessary to detect the wobbling phase of the meandering or wobbled prepit pattern. To this end, a mark for synchronization is previously formed on the optical disk also in the form of prepits, wherein the wobbling phase is determined by detecting the mark for synchronization and at the same time the position of the prepit is identified.

An example of the track format which may be employed in carrying out the present invention will now be described in detail by referring to FIG. 7. One track consists of N sectors each of which in turn includes of M blocks, wherein one block includes L pairs of prepits (also referred to as prepit pair areas). Taking as an example the optical disk of 3.5 inches, the number of data bytes in one track assumed to be unformatted is 18 KB, the number of sectors (N) is in the range of about 20 to 24, the number of blocks (M) is about 20 to 40, and the number of prepit pair areas (L) is about 8 to 16. The number of prepit signal samples per track which has relevance to the tracking servo function and the clock generating function is about 6000 to 3000. Thus, in this case, influence of the defects can also be suppressed by selecting the cut-off frequency of the low-pass filter circuit lower than the frequency at which the tracking signal detecting marks (prepits) make appearance, as described hereinbefore.

In connection with the modulation of data to be recorded, it is preferred to use a fixed length code in view of the fact that the data is segmented in a fixed length. As the modulation system which is susceptible to the self-clocking, there may be mentioned 8/9 conversion, 4/5 conversion, a certain 2-7 modulation and other systems. Among them, the 2-7 modulation and 1-7 modulation are preferred. From the viewpoint of density, the 2-7 modulation is advantageous, while the 1-7 modulation is preferred when taking into consideration the available margin for detection. In the magnetooptical disk system in which severe requirement is imposed in respect to the S/N ratio and in which the recording/reproducing channels scarcely bring about degradation in amplitude at the data frequency as used, the 1-7 modulation having tolerance in respect to the detection margin is preferred. It should however be mentioned that a variable-length code can also be used as well in consideration of efficiency in the recording density.

Figure 7:
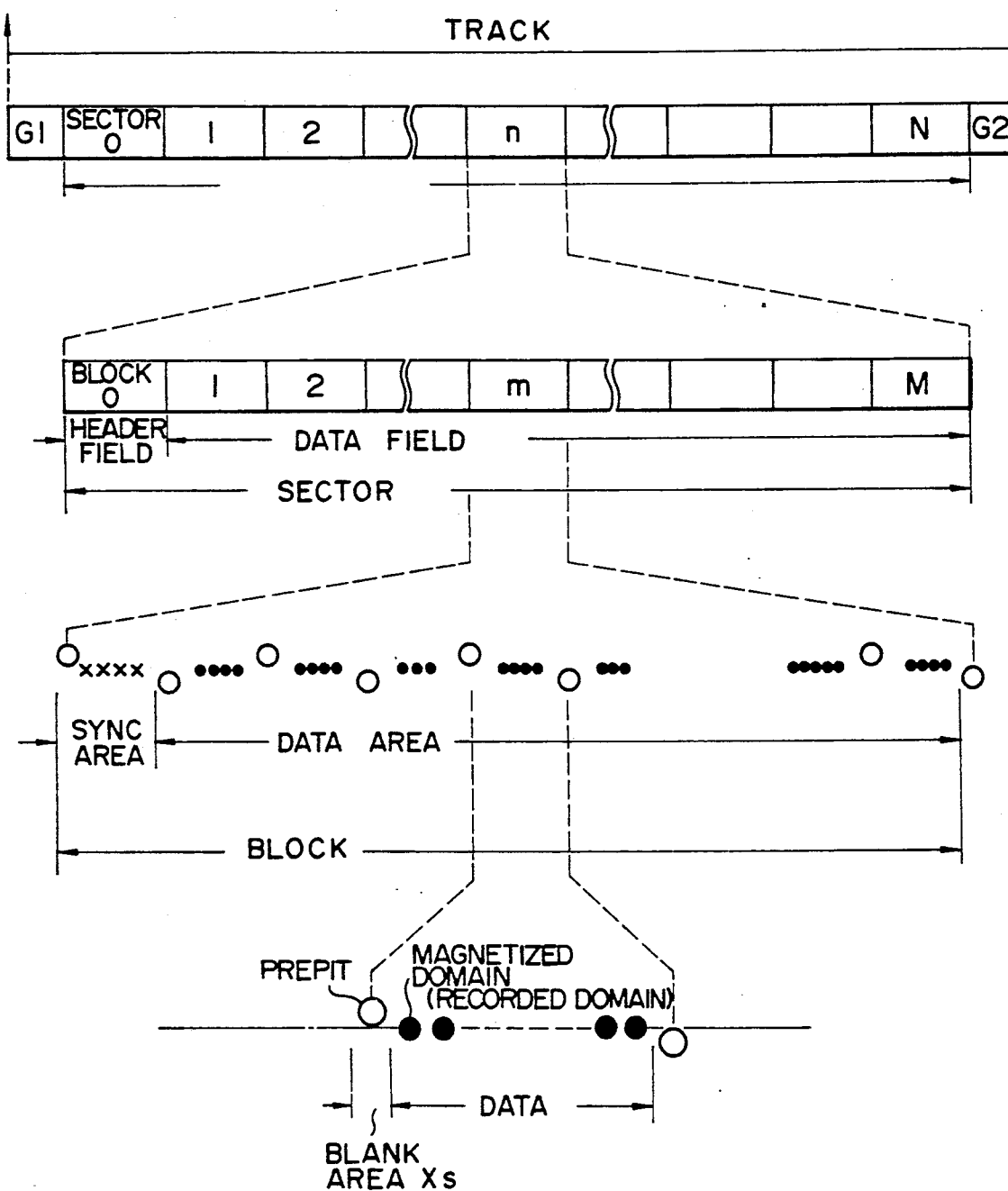
FIG. 7 is a diagram illustrating in detail an example of the track format which can be employed according to the invention.

As the recording scheme, there can be mentioned the pit position recording in which information is carried at the center location of the magnetized domain, as in the case of the track format shown in FIG. 7 or the edge recording according to which the information is recorded at the edges of the magnetized domain, as illustrated in FIG. 5. In the case of the pit position recording, no consideration is needed for the modulation method. However, the recording density attainable with the pit position recording is low when compared with the pit edge recording. Since data to be handled in the system according to the illustrated embodiment of the invention is of a fixed length, adoption of the pit edge recording scheme is attended with such restriction that the start and the end of data to be recorded must necessarily coincide with either one of the recording levels. In order to solve this problem, data to be recorded may be added with an additional bit in accordance with the data content before undergoing modulation so that the level of the end of the data to be recorded coincides with either one of the recording levels after modulation or alternatively the data to be recorded may be added with an additional bit after modulation to thereby realize the matching of the recording level as required.

Figure 8:
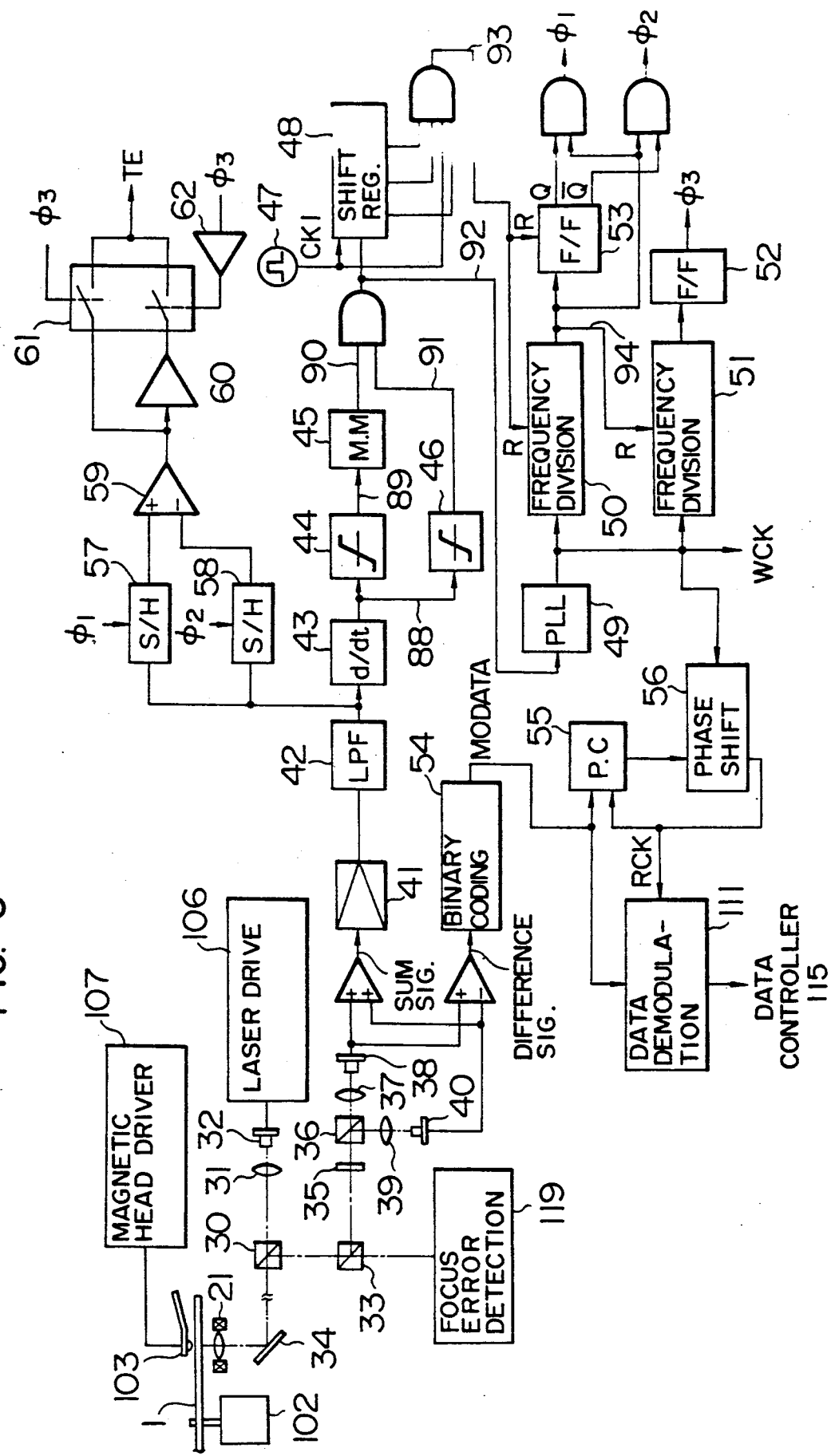
FIG. 8 is a block diagram showing a circuit arrangement of a signal detecting system according to an embodiment of the invention.

Now, a method of processing the detection signal in the optical disk system in which the format shown in FIG. 7 is employed will be described in detail by reference to FIGS. 8 and 9. Referring first to FIG. 8, a light beam emitted from a laser light source (e.g. semiconductor laser) 32 excited by a laser drive circuit 106 is collimated by a lens 31 to be guided to a voice-coil lens 21 by way of a beam splitter 30 and a galvano-mirror reflector 34, whereby the light spot 70 (FIG. 9) is focussed onto the optical disk 1. The resulting reflection light follows the optical path defined by the voice-coil lens 21, the galvano-mirror reflector 34 and the beam splitter 30 by which a part of the reflected light beam is so reflected as to impinge on a beam splitter 33 at which the light beam is divided into two split beams, one of them being applied to a focus error detecting system 119, while the other beam is caused to pass through a halfwave plate 35 to be subsequently separated into polarized light components by a polarized light beam splitter 36, the separated polarized light components being then focussed onto photodetectors 38 and 40 through associated lenses 37 and 39, respectively. The output signals from the photodetectors 38 and 40 undergo addition and subtraction, respectively, whereby a sum signal and a difference signal are produced, as can be seen in FIG. 8. From the sum signal, the prepit information and the reflected light intensity can be derived, while the magnetooptically recorded signal component can be derived from the difference signal. Referring to FIG. 9(A), when the light spot 70 moves along an inclined path intersecting tracks 71 and 72, the sum signal 73 varies in dependence on the prepit pattern in such a manner as illustrated in FIG. 9(B). this sum signal 73 is then amplified by an amplifier 41 to be subsequently inputted to a low-pass filter (LPF) 42, the output signal of which is differentiated by a differentiator circuit 43. The differentiated signal 88 having such waveform as illustrated in FIG. 9(C) is compared with a given threshold level (indicated by a broken line in FIG. 9(C)) by a comparator 44 to thereby derive a pulse signal 89 illustrated in FIG. 9(D). The pulse width of this pulse signal 89 is extended by a monostable multivibrator 45 to obtain a signal 90 illustrated in FIG. 9(E). On the other hand, a signal 91 indicative of zero-cross points of the differentiated signal 88, as shown in FIG. 9(F), is obtained by a zero-cross point detector 46 and subsequently logically ANDed with the signal 90 outputted from the monostable multivibrator 45, whereby there can be obtained a pit signal 92 indicating only the prepit pattern, as illustrated in FIG. 9(G). The pit signal 92 is inputted to a shift register 48 to be temporally shifted under a predetermined clock 47 to thereby detect the synchronization mark consisting of the prepits 86 and 87 on the basis of difference in the time interval between the prepits 86 and 87 and the time interval between the prepits 77 and 82, while a synchronization timing signal 93 is generated on the basis of the delay time of the register 48. Further, the pit signal 92 is applied to the input of a phase-locked loop (PLL) circuit 49 to generate a clock signal WCK which is in synchornism with the pit signal 92. The clock signal WCK is then inputted to a frequency division circuit 50 constituted by a counter to thereby generate pulses 94 at the timing coinciding with the presence of prepits periodically at a time interval at which the prepit makes appearance. The frequency division start timing of the counter 50 is determined by the synchronization timing signal 93 mentioned above. The pulse signal 94 is inputted to a flip-flop 53 to generate a signal having a period twice as long as the period at which the prepit makes appearance, which signal is then logically ANDed with the signal 94 to produce signals $\phi_1$ and $\phi_2$ illustrated in FIG. 9(H) and (I), respectively. These signals $\phi_1$ and $\phi_2$ represent the timing information corresponding to the positions of the prepits (tracking signal detecting marks) located on the left and right sides to the track center line. Further, the clock signal WCK is inputted to another frequency division circuit 51 constituted by a counter which is started at the timing of the signal 94 to thereby generate pulses each located at a position corresponding to a mid point between the adjacent prepits, the pulse signal thus produced being utilized for deriving a signal $\phi_3$ (FIG. 9(J)) by a flip-flop 52.

The output signal of the low-pass filter 42 is applied to the sample and hold circuits 57 and 58 to be sampled and held in response to the signals $\phi_1$ and $\phi_2$, respectively. The output signals of these sample and hold circuits 57 and 58 are applied to the inputs of the differential amplifier 59 to determine difference therebetween. The output signal of the differential amplifier 59 may be utilized as the track deviation signal as it is. In the case of the illustrated embodiment, however, the difference signal outputted from the differential amplifier 59 is applied to an inverter circuit 60, wherein the output signal of the inverter circuit 60 is applied to one input of an analog switch 61 having the other input to which the output signal of the differential amplifier 59 is directly applied. The analog switch 61 is changed over alternately by the signal $\phi_3$ and the inverted signal thereof obtained by applying the signal $\phi_3$ to an inverter 62. In this manner, the sampling frequency for detecting the track deviation (tracking error) can effectively be increased twice as high. It goes without saying that the low-pass filter may also be provided in the stage succeeding to the differential amplifier 54, as in the case of the arrangement shown in FIG. 1.

As the synchronizing pattern, there can be employed a particular array of prepits such as those designated by reference numerals 84, 85, 86 and 87 in FIG. 9(A) which has a time interval different from that of the meandering or wobbling prepit row serving as the tracking signal detecting marks, as described above. It should however be mentioned that the synchronizing pattern may be constituted by an elongated pit 95 or 96, as illustrated in FIG. 10(A). Additionally another elongated pit 88 may be provided between the tracks, as shown in FIG. 10(B). Similarly, the pattern of the prepits 84, 85 and 86, 87 shown in FIG. 9(A) may be provided between the tracks 71 and 72. In this case, the synchronizing mark can be detected even when the liquid spot is located between the tracks 71 and 72. In view of possible applications of the optical disk in the future, it is considered that the optical disk system now under consideration should also be capable of reproducing the write-once type disk used heretofore as well. In that case, the recorded data is detected from the sum signal described above at the same level as the track deviation signal and the synchronizing mark signal Discriminative identification of the synchronizing mark can then be realized by selecting the pit pattern which differs from the pit pattern for the recorded data.

Next, description will be directed to demodulation of the data signal. The difference signal obtained from the outputs of the photodetectors 38 and 40 is converted into a digital signal by a binary coding circuit 54, which digital signal is then applied to an input of a phase comparator 55 having the other input supplied with a reproducing clock signal RCK derived from the clock signal WCK outputted by the PLL circuit 49 after undergone phase error correction through a phase shift circuit 56 which in turn is so controlled by the output signal of the phase comparator 55 that the clock signal RCK is in phase with the reproduced data signal. In this way, the clock signal RCK can be controlled to be in synchronism with the recorded and reproduced data signal even when the magnetized domains suffer temporal shift (this is the so-called self-clocking control). The reproduction clock signal RCK is inputted to a demodulator circuit 111 to demodulate the data. With this arrangement, recording can be performed without undergoing the influence of eccentricity of the disk and fluctuation of disk rotation because the clock signal WCK is employed which is in synchronism with the prepit signal. On the other hand, upon reproduction, a clock signal having the frequency coinciding with that of the recorded data can be detected in synchronism with the prepit signal without being influenced by the disk eccentricity and fluctuation in the rotation. By detecting the deviation in the phase between the clock signal and the reproduced data signal and performing the phase control such that the phase deviation can be cancelled out, it is possible to obtain the clock signal RCK for reproduction which is in synchronism with the data to be reproduced.

Figure 11A:
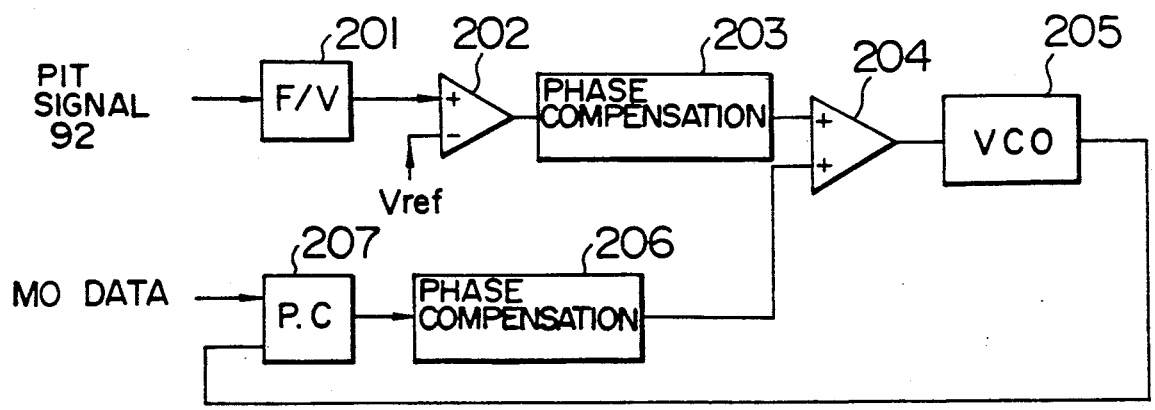
FIG. 11A is a block diagram showing a circuit configuration of a system for generating a clock signal for reproduction.
Figure 11B:
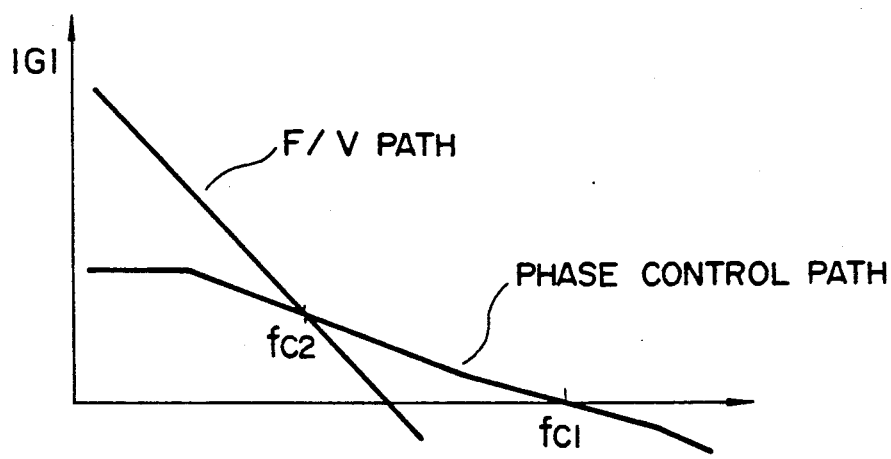
FIG. 11B is a characteristic diagram illustrating the loop characteristics of the system shown in FIG. 11A.

Another embodiment of the circuit for generating the reproducing clock signal RCK will be described by reference to FIG. 11(A). The pit signal 92 is inputted to a frequency/voltage (F/V) converter 201, whereby the frequency of the pit signal 92 is converted into a voltage signal which is then compared with a reference speed voltage signal $V_{ref}$ by a differential amplifier 202, the resulting difference being applied to one input of a summing amplifier 204 by way of a phase compensation circuit 203. The summing amplifier 204 has the other input supplied with the output signal of a phase compensation circuit 206 which in turn is supplied with a phase difference signal outputted from a phase comparator 207 and representing a phase difference between the output of a voltage controlled oscillator 205 and the binary coded magnetooptical signal. Thus, there is implemented a control loop system having two inputs and one output. This control loop system includes the F/V path loop and the conventional PLL phase control loop and should preferably have such loop characteristics as illustrated in FIG. 11(B). In this Figure, the cross frequency $f_{c2}$ is selected in a range of 2 to 5 KHz in order to impart inertia to the F/V loop. The frequency handled in the PLL phase control loop is of the order of several hundred KHz with the self-clocking usually adopted. With such broad frequency band, however, influence of noise becomes intolerable. Accordingly, the frequency $f_{c1}$ shown in FIG. 11(B) should be selected higher than $f_{c2}$ about one order of magnitude and more preferably in the range of 20 to 50 KHz. With this arrangement, the reproducing clock signal RCK can be protected against overrunning due to defects and other causes. Besides, jitter brought about by noise can be reduced as compared with the conventional self-clocking system. Further, because of duplicate-loop configuration, gain in the low frequency range is increased, whereby the followup control characteristics can be improved.

Next, referring to FIGS. 12 to 15(A) and 15(B), description will be made of formats for the track access. In the access operation, it is necessary to detect always the track position correctly regardless of change in the moving speed of the light spot. In the case of the optical disk of 3.5 inches, the number of the track is in the range of 15,000 to 11,000 at the track pitch of 1.5 to 1.4 $\mu$m. Accordingly, all the track addresses can be satisfactorily defined with 14 bits. In the following description, it is assumed that 14 bits are employed for the track addresses.

Figure 12:
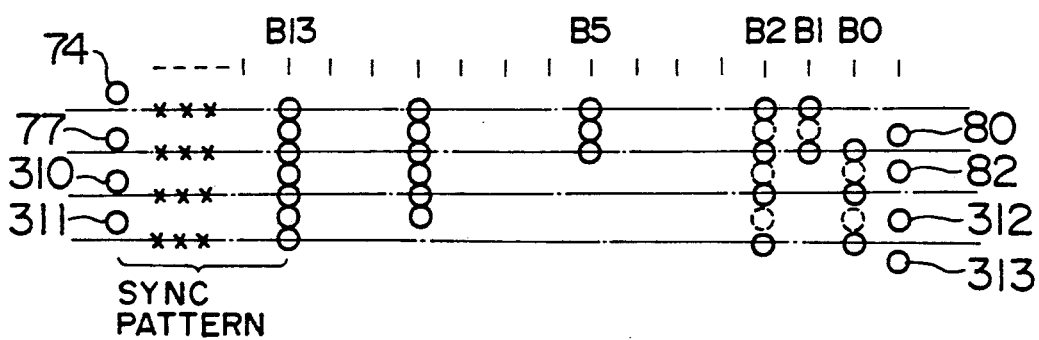
FIGS. 12, 13 and 14 are schematic diagrams for illustrating pit patterns for the track access provided in a synchronizing area, respectively.

In the basic format structure according to the illustrated embodiment, the address information is placed in the synchronizing area (labelled SYNC AREA) together with the synchronizing marks. By way of example, bits including the most significant bit B13 to the least significant bit B0 are placed in succession to the synchronizing marks (indicated by symbol x in the Figures), as illustrated in FIG. 12. Usually, when the light spot is moved at a high speed (e.g. at 1 m/sec.,) in the access operation, there is a high probability that the light spot may have passed over a track before all the address bits of that track are read out. Accordingly, it is proposed to place a bit pattern including at least nine more significant bits B13 to B5 between the adjacent tracks, as is illustrated in FIG. 12. This is for the purpose of making it possible to detect these more significant bits, even when the light spot moves at the highest speed, because otherwise there remains uncertainty corresponding to five less significant bits in the track address detection. By virtue of the nine more significant bits placed between the adjacent tracks, satisfactory access speed control can be accomplished even when the light spot moves at a high speed. Needless to say, the less significant bits may preferably be placed between the tracks, as indicated by broken lines in FIG. 12, to thereby further enhance the reliability in the track address detection.

The format shown in FIG. 12 requires as many as 14 bits for the track address and this can not be applied to the case where the synchronizing area (SYNC AREA) has no adequate margin in respect to the number of data capable of being recorded therein. In this case, the nine more significant bits may be distributively placed in the synchronizing areas of nine blocks, respectively, on a one-by-one bit basis, with the five less significant bits being placed in the synchronizing area of each block, as will be seen in FIG. 13. With this format, the nine more significant bits can not be detected before nine blocks have been read. However, the access control can satisfactorily be accomplished with this format, although it certainly depends on the speed of the light spot. In case the distribution of the nine more significant bits among nine blocks on the one-bit basis is intolerable in respect to the number of the blocks as required, the nine more significant bits may be distributed among the blocks by 2 or 3 bits to thereby decrease correspondingly the required number of blocks.

Figure 13:
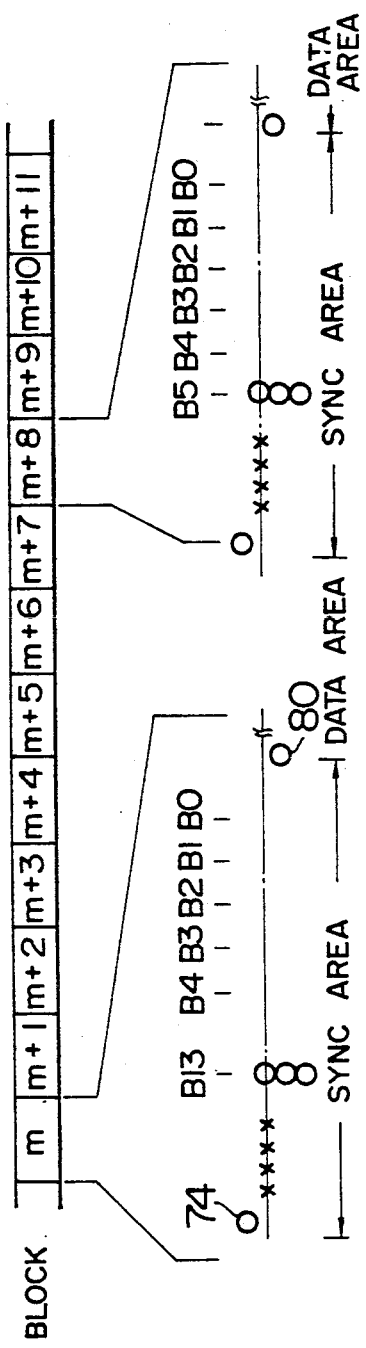
Figure 14:
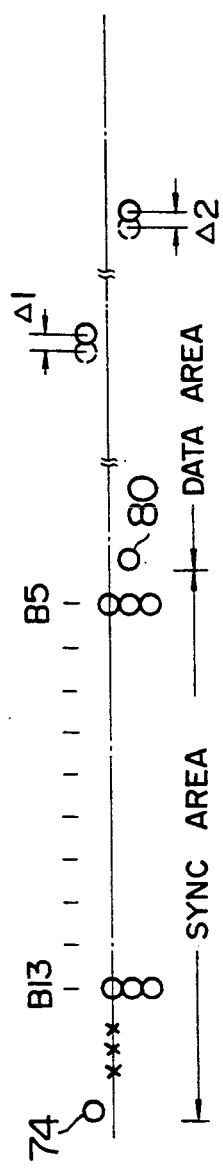

The format shown in FIG. 13 can be advantageously employed when the number of blocks is sufficiently large. However, in case the number of available blocks is small, the number of sampled values for the speed control is decreased correspondingly, involving instability in the speed control, which makes high-speed seeking operation impractical. In that case, the five less significant bits B4 to B0 shown in FIG. 12 may be represented by the wobbling prepits which serve at the same time for the tracking signal detecting mark. More specifically, one of the paired prepits formed for the detection of the tracking signal is deviated by 1 from the positions (indicated by broken line) at which the prepits are inherently to be provided, as is illustrated in FIG. 14. Further, the other prepit is also deviated from its intrinsic position by $\Delta 2$. To this end, the blank area $X_s$ is enlarged by one bit, as is illustrated in FIG. 5(A), whereby the prepits are deviated each by a distance corresponding to ½ bit so that the phases of the prepits correspond to the less significant bits B4 to B0, respectively. In this case, deviations or displacements $\Delta 1$ and $\Delta 2$ are of the same amount in the same time basis direction.

Figure 15B:
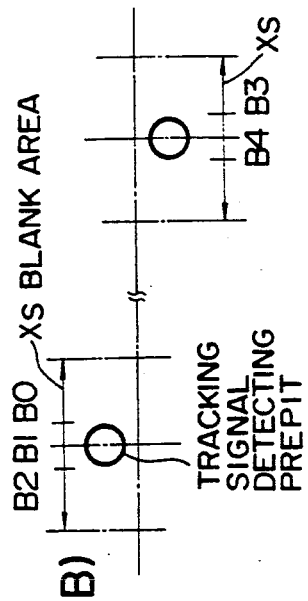
FIGS. 15(A) and 15(B) are diagrams showing typical examples of pit patterns for the track access, respectively.
Figure 15A:
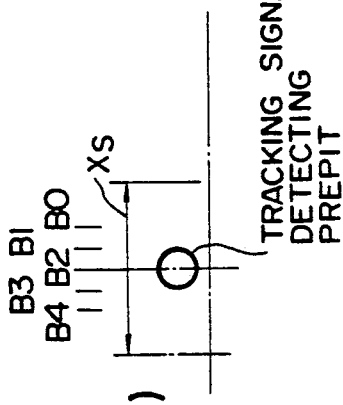

Another example of the format is shown in FIG. 15(B), in which the positions of the paired prepits for the tracking signal detection are so displaced as to represent the less significant bits B4 to B0. In a version of this format, two displacements $\Delta 1$ and $\Delta 2$ may be utilized to represent each of the less significant bits B4 to B0 divided in two groups, as shown in FIG. 15(B). With this format structure, overhead of the blank area $X_s$ is reduced to enhance the utilization efficiency of data.

It is noted that in the case of the format shown in FIG. 14, those of the tracking signal detecting prepits which represent the less significant bits of the address information are not allowed to be used for generating the clock signal, because these prepits are deviated in the phase. To deal with this problem, phase synchronization of the PLL may be established in the synchronizing area (SYNC AREA). Alternatively, marks for the PLL synchronization may be provided in the form of the prepits shown in FIG. 10(B) in a radial row for establishing the phase synchronization.

As will be appreciated from the above description, the track addresses can be detected with a high accuracy in a simplified manner when the light spot is simply moved over the tracking signal detection marks.

For coding the fourteen bits used for the pattern for the access control, a reflected binary code (gray code) can be employed. Since each of the binary expressions differs from the preceding expression in one place only in this code, it is possible to perform the error check or other functions as desired.

What is claimed is:

1. An information recording/reproducing apparatus for recording and/or reproducing information on or from a recording medium on which wobbling prepits are intermittently provided along each track in a pattern wobbling alternately across the track center with a very small displacement therefrom, wherein data recording areas are defined between said wobbling prepits with a synchronizing prepit being provided for every predetermined number of pairs of said wobbling prepits, comprising:
   a head for illuminating said data recording area on said recording medium with a light beam;
   a servo system including a track deviation detecting circuit for obtaining a tracking signal by detecting said wobbling prepits through sampling with said light beam;
   a control circuit for performing control operation in accordance with said tracking signal such that said light beam follows said track; and
   positional information detecting means for detecting track address information for access by detecting the phase of said wobbling prepits in accordance with a signal obtained from said synchronizing prepits.

2. An information recording/reproducing apparatus according to claim 1, wherein said wobbling prepits include tracking signal detecting marks intermittently provided along each track in a pattern wobbling alternately across the track center with a very small displacement therefrom.

3. An information recording/reproducing apparatus according to claim 2, wherein said track deviation detecting circuit includes a low-pass filter circuit having a cut-off frequency which is lower than a frequency at which said tracking signal detecting marks appear in the course of the detection thereof, said low-pass filter circuit filtering the tracking signal for enabling production of a signal for use in tracking control.

4. An information recording/reproducing apparatus according to claim 2, wherein a recording inhibited area where no data is recorded is provided between said tracking signal detecting mark and said data recording area to thereby reduce interference between said mark and the data recorded in said recording area.

5. An information recording/reproducing apparatus according to claim 2, further including means for shifting the phase of a clock signal obtained from said tracking signal detecting marks so that the phase of said clock signal coincides with the phase of a reproduced signal of said data for deriving said clock signal for demodulating said data.

6. A method of recording and/or reproducing information on or from a recording medium on which wobbling prepits are intermittently provided along each track in a pattern wobbling alternately across the track center with a very small displacement therefrom, and wherein data recording areas are defined between said wobbling prepits with a synchronizing prepit being provided for every predetermined number of pairs of said wobbling prepits, comprising the steps of:
   recording track address information on the track in dependence upon a position of said wobbling prepits in a direction of the track;
   detecting a phase of said wobbling prepits in accordance with a signal obtained from said synchronizing prepits; and
   detecting track address information for access to the track in accordance with the signal obtained from said synchronizing prepits.

7. An information recording/reproducing method according to claim 6, wherein the detecting of the phase of said wobbling prepits includes utilizing a light beam.

8. An information recording/reproducing method according to claim 6, wherein said wobbling prepits include tracking signal detecting marks intermittently provided along each track in a pattern wobbling alternately across the track center with a very small displacement therefrom, the data recording areas being defined between said tracking signal detecting marks, and further comprising the steps of driving a tracking signal by detecting said tracking signal detecting marks, and recording or reproducing data on or from said recording areas while following the track utilizing a servo system, the servo system including a low-pass filter circuit having a cut-off frequency which is lower than a frequency at which said tracking signal detecting marks make appearance in the course of the detection thereof, the low-pass filter circuit filtering said tracking signal for producing a signal for use in tracking control to enable following of the track.

9. An information recording/reproducing method according to claim 8, wherein the cut-off frequency of said low-pass filter circuit is higher than a frequency of a frequency band required for said servo system.

10. An information recording/reproducing method according to claim 8, where a recording inhibited area where no data is recorded is provided between said tracking signal detecting mark and said data recording area to thereby reduce interference between said mark and the data recorded in said recording area.

11. An information recording/reproducing method according to claim 8, further including a step of shifting the phase of the clock signal obtained from said tracking signal detecting marks so as to coincide with the phase of a reproduced signal of said data for deriving said clock signal for demodulating said data.

12. An information recording/reproducing method according to claim 8, where a synchronizing mark is provided in said recording area for every predetermined number of pairs of said tracking signal detecting marks, further including a step of generating a timing signal for sampling said tracking signal detecting marks from said synchronizing marks and said tracking signal detecting marks.

13. An information recording/reproducing method according to claim 12, wherein address signal marks for access are provided together with said synchronizing mark (SYNC).

14. An information recording/reproducing method according to claim 13, wherein at least more significant bits of said address signal are provided between the tracks.

15. An information recording/reproducing method according to claim 13, wherein positions of said tracking signal detecting marks are displaced in accordance with a least less significant bits of said address signal.

* * * * *